United States Patent Office 3,848,045
Patented Nov. 12, 1974

3,848,045
PRE-FABRICATED GEL COATS
Stanley Oswitch, University Heights, and Kevin K. Kipp, Cleveland Heights, Ohio, assignors to Ferro Corporation, Cleveland, Ohio
No Drawing. Continuation-in-part of application Ser. No. 199,752, Nov. 17, 1971, now Patent No. 3,770,690, which is a continuation of abandoned application Ser. No. 43,213, June 3, 1970. This application Aug. 6, 1973, Ser. No. 385,793
Int. Cl. B29d 3/00; C08g 51/04
U.S. Cl. 264—255
11 Claims

ABSTRACT OF THE DISCLOSURE

A pre-fabricated gel coat is disclosed in the form of a dry sheet that can be easily handled and preshaped as for lining a mold. The pre-fabricated gel coat comprises a layer of a curable epoxy resin and a fibrous reinforcing medium of thermoplastic fibers. The fibers have a softening temperature no higher than that of a heating operation to which the gel coat is to be subjected, such as a molding operation. When heated, the partially cured resin and the thermoplastic fibers soften to permit the gel coat to flow and accommodate itself to a desired, nonplanar configuration with subsequent final cure of the epoxy resin in the desired nonplanar configuration. Preferably, the gel coat is used to line a mold in which a heat-settable resin and curable resin may be cured substantially simultaneously to form a product of the heat-settable resin having a covering of the gel coat. Simultaneous cure of a heat-settable resin and the gel coat within a mold avoids the messiness and nonuniform thickness resulting from brushing or spray coating molds prior to molding and considerably reduces the time required for the total molding operation.

CROSS-REFERENCE TO RELATED APPLICATIONS

This is a continuation-in-part of an application entitled "Pre-Fabricated Gel Coats," filed Nov. 17, 1971, Ser. No. 199,752, now Pat. 3,770,690, which is a continuation of an application entitled "Pre-Fabricated Gel Coats," filed June 3, 1970, Ser. No. 43,213, now abandoned. Another related case having the same title and directed to gel coats containing polyester resins was filed on Jan. 8, 1973, Ser. No. 321,584.

BACKGROUND OF THE INVENTION

Field of the Invention

This invention relates to a gel coat in dry sheet form that is easily handled and can be preshaped, for example, to fit a mold. More specifically, it relates to a pre-fabricated gel coat comprising a layer of a partially cured, curable, epoxy resin and a fibrous reinforcing medium of thermoplastic fibers having a softening temperature no higher than that of a molding temperature used, for example, to mold a resin defining a back-up system to be covered by the gel coat.

RELATED PRIOR ART

It is common practice in molding compositions of resin and fiber glass to provide an exterior layer of a resin to impart a smooth protective surface to the molded product. This is generally accomplished by spraying or brushing a liquid gel coat onto the interior surface of a mold to be used. After the mold is coated in this manner, the molding composition is added and the necessary heat and pressure applied to complete the molding operation.

Gel coats presently in use, as for press molding operations, contain a resin that is liquid and flowable prior to the actual molding operation. The application of a gel coat either by hot spraying or brushing is, therefore, a messy procedure and often results in uneven coatings. In some areas, the coating may be too thin while in other areas the coating is too thick. Such prior application techniques excessively waste gel coating material and are time consuming, causing a slower rate of production. Further, fibrous reinforcement, such as glass fibers, within a gel coat layer has not adapted well when the gel coat is to be shaped as in lining a mold. Fibers like glass fibers do not uniformly adjust to a nonplanar configuration in that they do not flow or accommodate themselves to a curving or undulating surface. Such fibers tend to bunch or congregate at space intervals instead of maintaining a desired, fairly even distribution.

SUMMARY OF THE INVENTION

In accordance with the present invention, a gel coat is pre-fabricated in a dry sheet for that can be easily handled and preformed to fit a site of application, such as the interior of a mold, and thereafter initially fused and then cured substantially simultaneously with a heat-settable molding resin that is placed in the mold. A leading advantage of the present invention resides in the use of a dry sheet. This provides an accurate control of the gel coat thickness, completely eliminates overspray of a sprayed liquid system and its attendant problems, and simplifies inventory since the present sheet has a long storage shelf life at ambient temperatures.

The gel coat comprises a partially cured, curable epoxy resin and thermoplastic fibers. To acquire thermosetting properties, the epoxy resin desirably includes a cross-linker, such as a polyanhydride, and especially one that is solid at room temperature, in order to facilitate retention of the dry form for the pre-fabricated gel coat. The thermoplastic fibers must have a softening temperature no higher than the operating temperature of the molding operation or the like to which the gel coat is to be subjected. The thermoplastic fibers comprise a resin that is compatible with the epoxy resin of the gel coat, for example, a thermoplastic, saturated polyester resin preferably in the form of a non-woven mat.

When heated in use, the partially cured epoxy resin as well as the thermoplastic fibers of the gel coat fuse, so that both of these phases of the gel coat flow and accommodate themselves to a desired, nonplanar configuration. Further heating finally cures the thermosetting epoxy resin, while upon cooling at least some, if not all, of the thermoplastic fibers retain their fibrous identity and serve to reinforce the gel coat covering.

When the heating and final cure of the gel coat accompany the heating of a heat-settable resin in a mold lined by the gel coat, a product is formed comprising the heat-settable resin and a covering of the gel coat. Accordingly, a further advantage of the present invention resides in an acceleration of the molding cycle, since the gel coat and the heat-setable material forming the bulk of the molded product are both cured in one, single step.

DESCRIPTION OF THE PREFERRED EMBODIMENTS

The present dry gel coat comprises a solid, flexible, handleable sheet or layer adapted to stretch and flow to accommodate itself to nonplanar surfaces. The gel coat layer comprises two phases including an epoxy resin and compatible thermoplastic fibers having a softening temperature that is, for example, no higher than the maximum temperature of a heating operation, such as a heat-molding operation, to which the gel coat is to be subjected.

A particularly suitable resin for the purpose of this invention is prepared by reacting an epoxy resin having a molecular weight in the range of 350–950 and an epoxy equivalent in the range of 150–550 with a polyaliphatic-dibasic acid polyanhydride having at least four anhydride repeating units in a linear polymer chain. Fumed alumina is used as filler. Advantageously a curing agent or accelerator is also used, such as a tertiary amine or a stannous alkanoate of 5–12 carbon atoms, for example, benzyldimethylamine, (dimethylaminomethyl)phenol, stannous octoate, etc. The product can be cast as a film or layer by warming the composition to about 50° C. to give flow properties, or a solvent may be used and the resultant solution applied.

The epoxy resin and polyanhydride can be mixed by heating to 100° C. at which temperature the ingredients are easily stirred, and the resultant hot melt is mixed with the fumed alumina filler, and the accelerator, such as benzyldimethylamine. The fumed alumina assists in maintaining the dry or relatively dry state of the pre-fabricated gel coat. Once the accelerator is added, it is advantageous to apply the composition to avoid premature gelation, although there is no noticeable increase in viscosity in four hours and gelation does not occur in less than 16 hours. If the composition is not to be used within a few hours, the accelerator should be withheld until the appropriate time.

Tertiary amines are suitable as accelerators for the epoxy resin compositions of this invention, preferably those having no more than 18 carbon atoms. Particularly preferred are benzyldimethylamine, (dimethylaminomethyl)phenol, tris(dimethylaminomethyl)phenol, dimethylaniline and pyridine. Also satisfactory are tributylamine, triamylamine, dimethylbutylamine, dimethylnaphthylamine, diethyltolylamine and the like. While tertiary amines are preferred, stannous alkanoates of 5–12 carbon atoms can also be used, such as the octoate, caproate, heptoate, decoate and dodecoate.

Based on 100 parts of epoxy resin, the various components are used in the proportions of 50–85 parts, preferably 65–70 parts of polyanhydride; 10–25, preferably 14–19 parts of fumed alumina; and 0.5–5 parts of accelerator, preferably 0.6–0.8, particularly when the preferred tertiary aromatic or benzyl amines are used.

Advantageously the epoxy resin is fluid without dilution. However, if the particular epoxy resin used is solid at room temperature, it is advantageously melted by heating to 70–80° C., or a solvent may be used, particularly if the resultant composition is to be applied as a solution. The polyanhydride is generally solid at room temperature, and is advantageously melted by heating to 70–80° C., or is dissolved in a slovent such as xylene, toluene, acetone or other ketone or mixture thereof.

Solvents suitable for dissolving the resultant resin reaction product include various hydrocarbons such as xylene, toluene, and the like. Also suitable are chlorinated hydrocarbons such as dichloroethylene, trichloroethylene, chlorobenzene, etc.; ketones such as acetone, methylethylketone; alcohols such as ethanol, propanol, butanol and the like.

The fumed alumina filler is preferably added in an amount of 6–12 parts per 100 parts of combined resin components. Fumed alumina is a commercially available alumina of extremely small particle size having diameters of less than 1 micron, preferably less than 0.5 micron. This is predominantly of the gamma crystalline form and is produced by the hydrolysis of $AlCl_3$ in a flame process to approximately 99% alumina with a specific gravity of about 3.6 and a refractive index of 1.7. A preferred particle size of fumed alumina has an average particle diameter of about 0.03 micron.

The epoxy resin is a polymeric reaction product of epichlorohydrin or a corresponding butyl compound with a dihydroxy phenol, such as bisphenol, resorcinol, hydroquinone, dihydroxydiphenyl, dihydroxydiphenylmethane, and also of novolac resins such as linear-formaldehyde-cresol resins which have been etherified with epichlorohydrin or a corresponding butyl compound to give glycidyl or epoxy butyl ether derivatives. The epoxy resin can comprise the straight resin or the resin is dissolved in the monomeric epoxy compound such as diglycidyl-bisphenol.

A typical epoxy resin is illustrated by the following formula for a polymer of the diglycidyl bisphenol type:

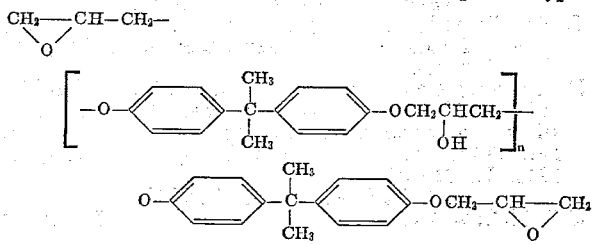

When the value for $n$ in the formula is 0, the formula represents the monomeric diglycidyl ether of bisphenol. With $n$ having a value of 1, the formula represents the dimer which has a molecular weight of 634. When $n$ has a value of 2, the formula represents the trimer which has a molecular weight of 918 and a melting point of about 65–70° C.

The respective epoxybutyl groups are represented by the formulas

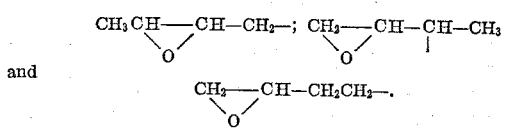
and
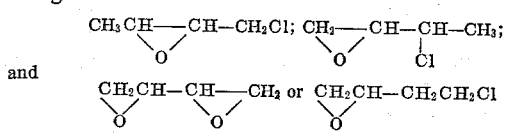

The corresponding epoxy butyl ethers are prepared by using

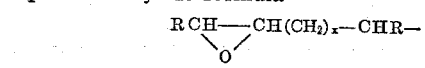
and
$$CH_2CH—CH—CH_2 \text{ or } CH_2CH—CH_2CH_2Cl$$

in place of epichlorohydrin to react with the dihydric phenols, such as bisphenol, dihydroxydiphenyl, dihydroxydiphenylmethane, resorcinol and hydroquinone, or with the novolac resin. These epoxybutyl and glycidyl radicals are represented by the formula $$RCH—CH(CH_2)_x—CHR—$$

wherein $x=0$ or 1, R is hydrogen or methyl, with no more than one R representing methyl and when $x=1$, both R's represent hydrogen.

The epoxy resins of the dihydric phenols are represented by the following formula:

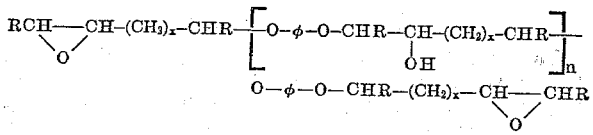

wherein $\phi$ represents the divalent radical derived by the removal of the hydroxy groups from the respective dihydric phenols, and the other symbols have the definitions given above.

The novolac based epoxy resins are represented by the formula:

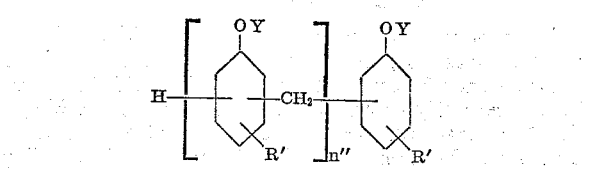

wherein Y is hydrogen or an epoxy radical of the formula

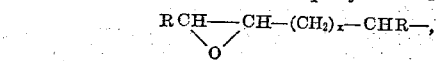

as defined above, there being at least three of said epoxy radicals per polymer molecule, and R' represents hydrogen or an alkyl group of 1–5 carbon atoms. The initial novolac resin is prepared by the reaction of formaldehyde with a phenol such as phenol, cresol, ethylphenol, propylphenol, butylphenol, amylphenol and the like to give a linear polymer having at least four phenolic repeating units. The procedures for preparing such novolacs are well known in the art. These novolacs are then reacted, preferably under basic conditions such as in the presence of NaOH, with epichlorohydrin or an epoxy-butyl compound as described above to give a polymer derivative of the above formula.

The polyanhydrides of dibasic acids suitable for the practice of this invention are represented by the formula

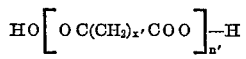

wherein $x'$ has a value of 5–10 and $n'$ has a value of at least 4, preferably at least 10 and need not exceed 20. Suitable polyanhydrides include those of pimelic, suberic, azelaic, sebacic, nonanedioic and decanedioic acids. Particularly preferred are polyazelaic polyanhydrides having a molecular weight in the range of 1500–3000.

The preferred polyanhydride is polyazelaic polyanhydride having at least 10 repeating units. In addition to the polyazelaic polyanhydride, the polyanhydrides of other dibasic acids having 5–10 methylene groups between the two carboxylic acids also can be used, advantageously having at least 4 repeating units, preferably at least 10 in the polymeric linear chain.

The thermoplastic fibers may comprise any fibers conventionally formed from a thermoplastic resin which is compatible with the thermosetting epoxy resins. For example, thermoplastic fibers may be used of polyethylene, polypropylene, polyacrylic acid, polyacrylic esters, the polyvinyl resins such as polyvinyl chloride, polyvinyl acetate, and polyvinyl alcohol, cellulose acetate, ethyl cellulose, polystyrene, nylon, polyurethane, and the like. The fibrous reinforcing medium is preferably non-woven.

The gel coat layer or sheet may be prepared by warming a partially cured epoxy resin as a semi-fluid state or by dissolving it in a solvent and applying a uniform layer of the semi-fluid resin or of the solvent and dissolved resin to a release paper by means of a gaged applicator. The resulting coating is then backed or covered with a reinforcing web or woven material of the thermoplastic fibers, the solvent evaporated, and the resin brought, if needed, to a more advanced polymeric state short of complete cure. The time and temperature of the heating to an advanced stage of polymeric growth is dependent upon particular epoxy resin system used.

In a preferred practice, a solution of the reactants forming the epoxy resin is prepared with an appropriate solvent, such as acetone, toluene, or xylene, and cast as a film on a release paper by means of a gaged draw bar. The film is heated in an oven to remove the solvent and effect a partial cure. Then, as previously described, a reinforcing fibrous layer is placed against the film. The thermoplastic fibers may either back a film of the thermosetting polyester resin as a simple laminate, or the fibers may be impregnated by or forced into the partially cured epoxy resin film. In the latter case, light pressure may be applied on the reinforcing layer as by passing the film of epoxy resin and web or veil of reinforcing thermoplastic fibers through a set of rollers. The purpose of the thermoplastic fibers is to add integrity to the gel coat while the epoxy resin is partially cured, allowing the gel coat to be cut, trimmed, or shaped prior to final cure; and to act as a surface veil hiding the underlying glass fiber pattern in the molded part when glass fibers are present. The thermoplastic fibers of the gel coat continue to act as a reinforcement after the gel coat is finally cured. As an example, the dry, pre-fabricated gel coat generally has an overall thickness of about 10 to about 25 mils, in which the curable, epoxy film comprises about 6 to 16 mils and the thermoplastic fiber reinforcement comprises about 3 to 10 mils in thickness. The sizes are not critical to the invention.

The availability and use of the dry, pre-fabricated gel coat of the present invention provide a number of advantages, including controlled, uniform thickness of the gel coat, cleaner and less wasteful operation, more ease and speed in handling, improved coverage of an underlying fiber pattern, reduced tendency for laminate warping, reduced tendency for gel coat crazing, blistering, cracking, sagging, sissing, and color variation, as well as the easy incorporation of other materials to give special properties such as abrasion resistance, conductivity, and the like, in the gel coat.

Although the present gel coat may be used in a variety of ways when positioned at a point of use to take advantage of its latent ability to advance to a final cure in a nonplanar configuration, a primary use of the gel coat is in lining a mold, especially a press mold, for substantially simultaneous curing with a heat-settable resin which fills the mold and forms the bulk of the molded product. In this practice of the invention, the dry flexible gel coat lines the inside, for example, of a female mold. It is possible to overlap sections of the gel coat or to pierce it without joining lines becoming apparent in the finished molded part. At this time, the partially cured epoxy resin and cross-linker are substantially unreacted. The heat-settable resin, which may include chopped glass fibers, is next introduced into the mold.

As heat is applied, both the partially cured, curable epoxy resin and the thermoplastic fibers fuse, so that the gel coat easily flows to accommodate itself to a nonplanar surface of the female mold, including any curving or flat surfaces, and as well as the shape of the male mold, as for example in molding a tray. The gel coat literally drapes itself uniformly along the mold in a matching configuration. As the heating continues, the polyanhydride present initiates the final cure of the curable epoxy resin and the heat-settable resin also advances to a final cure. Thus, at no time, is a solvent or liquid carrier needed to place the gel coat in a desired position. A product is thus formed of the heat-settable resin having an adherent covering of the gel coat.

There is little or no phase separation between the epoxy resin and the thermoplastic fibers during a forming and cure step. During the heating of the molding operation, the thermoplastic fibers do not bunch. Their softening enables the fibers to bend and otherwise assume a nonplanar configuration with the epoxy resin phase without substantially separating or segregating into spaced areas of densified fibers. Those fibers in the gel coat nearest the mold surface may sufficiently fuse to lose their fibrous identity. However, as a rule, at least some and generally all of the fibers retain their fibrous form and continue to reinforce the gel coat. The gel coat may be reduced in thickness as a result of the molding operation, for example, to a thickness of about 5 to 15 mils. The cosmetic effects, the gel coat can be prepared in a variety of colors, or it may be prepared as a translucent coating where color is not important. A recommended cure schedule for use with pre-fabricated gel coatings of the present invention is from about 250° F. to about 350° F. for 20–30 minutes. Pressures may range from about 50 p.s.i. to about 400 p.s.i.

The following examples are intended only to illustrate the invention and should not be construed to impose limitations upon the claims. Parts and percentages recited here and throughout the specification are by weight unless otherwise provided.

EXAMPLE 1

A resin composition is prepared using 100 parts of a diglycidyl bisphenol A liquid resin having an average molecular weight of 900, an epoxide equivalent of 500, a viscosity of 1.4 poises at 25° C., and an equivalent weight of about 145 (grams of resin to esterify one mole of acid). This comprises a major part of diglycidyl bisphenol trimer and approximately 5% of the corresponding dimeric compound. To this is added 70 parts of polyazelaic polyanhydride having an average molecular weight of 2300. These materials are heated to about 100° C. and mixed with stirring to obtain uniform mixture. Then to this hot blend are added and mixed 15 parts fumed alumina and 0.6 parts of benzyldimethylamine. This mixture has a pot life of more than 16 hours with no apparent change in viscosity occurring within 4 hours. A film is drawn from the resultant blend maintained at 50° C. to give a thickness of 10-20 mils and reinforced with a polyester veil material.

In preparing the film, the material is applied to a sheet of "Mylar" release film by a 6 inch doctor blade mounted between two guides and adjustable to give from 10 to 20 mils thickness. After the desired thickness is cast, it is gelled for 20 minutes at 125° C., a polyester fiber ("Pellon") reinforcing layer is then placed on top of the resin. This film is used to line the inner surface of a mold. Then the mold is filled with a fiber glass impregnated epoxy resin and molded at a temperature of 120-150° C. for 30 minutes. A very smooth molded surface is obtained with the outer film being integrally molded to the main part of the molded product.

As described in Example 1 of the cited, copending application, Ser. No. 321,584, a polyester resin may be used in place of the epoxy resin in filling the mold.

EXAMPLE 2

The procedure of Example 1 is repeated except that the resin composition is prepared in a solution by adding a solvent comprising 50-50 percent by weight mixture of acetone and xylene to give a solution containing 75% solids. The solution is cast and the solvent evaporated to give a film. This is treated as in Example 1 before being used to line a mold. Similar results are obtained as in Example 1 upon molding.

EXAMPLE 3

The procedure of Example 1 is repeated a number of times with similar results using in place of the polyazelaic polyanhydride an equivalent weight of polysebacic polyanhydride with a corresponding molecular weight.

EXAMPLE 4

The procedure of Example 1 is repeated three times with similar results using individually in place of the diglycidyl bisphenol resin equivalent weights respectively of (a) A resin prepared from:

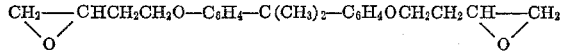

having an epoxy equivalent of approximately 195 and an average molecular weight of about 400;

(b) A resin prepared from:

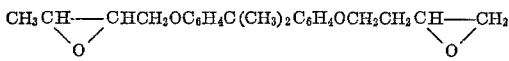

having an epoxy equivalent of approximately 240 and an average molecular weight of 510; and (c) A resin prepared from:

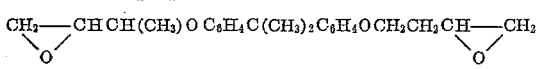

having an epoxy equivalent of approximately about 350 and an average molecular weight of about 600.

In each case the compositions are drawn to films, processed and used to line molds before filling and molding as in Example 1.

EXAMPLE 5

Similar results are obtained when equivalent weights respectively of the corresponding polyanhydrides of polypimelic, polysuberic and polydecanedioic acids are individually substituted for the polyazelaic in the procedure of Example 1.

EXAMPLE 6

Similar results are obtained when an equivalent amount of an epoxy resin derived from a novolac is used having an epoxy equivalent of about 190 and an average molecular weight of about 400 in the procedure of Example 1.

EXAMPLE 7

The procedure of Example 1 is repeated a number of times with similar results using individually in place of the benzyldimethylamine equivalent amounts respectively of (dimethylaminomethyl)phenol, tris(dimethylaminomethyl)phenol, dimethylaniline and pyridine. In each case good results are obtained in the pre-fabricated gel coating and its application and curing in a mold.

It is understood that additives may be incorporated in the present gel coat such as conventional pigments and fillers. Fillers, for example, may include calcium carbonate, silica, clays, barium sulfate, asbestos, talc, etc. added in an amount of about 5 to about 25 parts per 100 parts of resin. Still other known additives may be incorporated to impart fire retardancy, chemical resistance, abrasion resistance, weatherability, color versatility, and the like. The present pre-fabricated gel coat, being dry, is easy to handle and can, if desired, be stored until needed. The fiber reinforcement not only adds integrity to the gel coat in its partially cured stage, but allows it to be cut, trimmed, or otherwise shaped prior to be fitted into a mold and finally cured. When the present gel coat is used to line the interior of a mold, it may be simultaneously cured with a resin back-up system forming the bulk of the product to be molded. This cannot be accomplished with conventional liquid gel coats which are applied and cured in procedural steps that are separate from their lamination to another resinous body.

Although the foregoing describes several preferred embodiments of the present invention, it is understood that the invention may be practiced in still other forms within the scope of the following claims.

We claim:

1. A process for molding a product from a curable, moldable resin composition in a mold therefor, comprising:
   (a) lining said mold with a dry, flexible prefabricated gel coat comprising a layer of a partially cured, curable, epoxy resin formed by reacting an epoxy resin having a molecular weight in the range of 350 to 950 and an epoxy equivalent in the range 150 to 550 with a polydibasic acid polyanhydride having at least four anhydride repeating units in a polymer chain, and a fibrous reinforcing medium of thermoplastic resin compatible with the epoxy resin, said epoxy resin containing in parts by weight 50-85 parts of said polydibasic acid polyanhydride, 10-25 parts of fumed alumina, and 0.5-5 parts of an accelerator per 100 parts of said resin;
   (b) adding to said mold a moldable resin composition selected from the group consisting of epoxy resins and polyester resins;
   (c) heating the dry gel coat to soften the thermoplastic fibers and partially cured epoxy resin of the gel coat, flowing and shaping the softened thermoplastic fibers and partially cured epoxy resin to a desired shape determined by the mold; and
   (d) finally curing the partially cured epoxy resin of the gel coat.

2. The process of claim 1 comprising substantially simultaneously curing said resin composition and finally curing the curable epoxy resin of said gel coat to form a product of the curable resin composition having a covering of said gel coat.

3. The process of claim 1 in which during steps (c) or (d) at least some of the thermoplastic fibers retain their fibrous identity to reinforce the gel coat.

4. The process of claim 1 in which said thermoplastic fibers comprise a saturated polyester resin.

5. The process of claim 1 in which said epoxy resin of the gel coat is represented by a formula selected from the class consisting of (A)

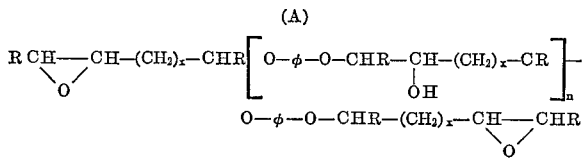

and (B)

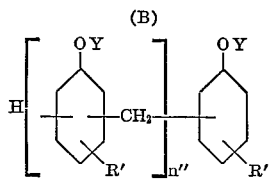

wherein $x$ represents 0 or 1;

$n$ has an average value of at least 0.5;

R is hydrogen or methyl, with no more than one R representing methyl, and when $x=1$, both R's represent hydrogen;

$\phi$ is the divalent aromatic radical derived from bisphenol, dihydroxydiphenyl, dihydroxydiphenylmethane, resorcinol and hydroquinone by removal of the hydroxy groups therefrom;

R' is hydrogen or an ethyl radical of 1–5 carbon atoms;

$n''$ represents hydrogen or an epoxyalkyl radical of the formula

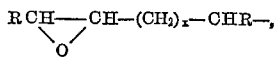

there being at least three of said epoxyalkyl radicals per polymer molecule;

the polydibasic acid polyanhydride being represented by the formula:

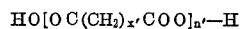

wherein $x'$ is an integer having a value of 5 to 10; and $n'$ is an integer having a value of at least 4;

and said accelerator is selected from the class consisting of tertiary amines and stannous alkanoates having 5–12 carbon atoms.

6. The process of claim 1 in which said epoxy resin contains per 100 parts of epoxy resin:

65–70 parts by weight of polydibasic acid polyanhydride;

15–19 parts by weight of fumed alumina; and 0.5–2 parts by weight of a tertiary amine.

7. The process of claim 5 in which said accelerator is a tertiary amine.

8. The process of claim 5 in which said epoxy resin is one having the formula (A).

9. The process of claim 5 in which said polyanhydride is polyazelaic polyanhydride having for $n'$ a value of 10–20.

10. The process of claim 1 in which said epoxy resin is a resin of the gel coat of the diglycidyl ether of bisphenol A.

11. The process of claim 1 in which said accelerator is a tertiary amine.

References Cited
UNITED STATES PATENTS

| | | | |
|---|---|---|---|
| 3,184,527 | 5/1965 | Fischer | 264—255 |
| 3,518,341 | 6/1970 | Haryu | 264—255 |
| 3,547,747 | 12/1970 | Roberts | 264—255 |

MORRIS LIEBMAN, Primary Examiner

S. L. FOX, Assistant Examiner

U.S. Cl. X.R.

260—37 EP, 40 R; 264—267